(12) United States Patent
Sharma et al.

(10) Patent No.: US 11,615,236 B1
(45) Date of Patent: Mar. 28, 2023

(54) MACHINE LEARNING MODEL BASED ELECTRONIC DOCUMENT COMPLETION

(71) Applicant: Intuit Inc., Mountain View, CA (US)

(72) Inventors: Himanshu Sharma, Toronto (CA); Peng Fei Wang, Ontario (CA); Pascal Lim-Fat, Richmond Hill (CA); Roberto Barboza Braz, Toronto (CA); Tatiana Tarnovskaya, Ontario (CA)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/867,952

(22) Filed: Jul. 19, 2022

(51) Int. Cl.
  *G06F 17/00* (2019.01)
  *G06F 40/174* (2020.01)
  *G06N 20/00* (2019.01)

(52) U.S. Cl.
  CPC ........... *G06F 40/174* (2020.01); *G06N 20/00* (2019.01)

(58) Field of Classification Search
  CPC .............................. G06F 40/174; G06N 20/00
  USPC .................................................. 715/222, 221
  See application file for complete search history.

(56) References Cited

U.S. PATENT DOCUMENTS

| | | | | |
|---|---|---|---|---|
| 7,158,986 | B1 * | 1/2007 | Oliver | G06F 16/9535 707/999.102 |
| 7,680,854 | B2 * | 3/2010 | Hyder | G06Q 10/10 707/811 |
| 9,262,393 | B2 * | 2/2016 | Naderi | G06F 40/174 |
| 10,331,950 | B1 * | 6/2019 | Suriyanarayanan | G06N 5/01 |
| 11,087,124 | B1 * | 8/2021 | Mehrotra | G06N 3/045 |
| 11,321,527 | B1 * | 5/2022 | Gopalarao | G06F 18/211 |
| 11,423,219 | B2 * | 8/2022 | Viswanathan | G06F 40/253 |
| 2018/0365593 | A1 * | 12/2018 | Galitsky | G06N 20/00 |
| 2019/0050755 | A1 * | 2/2019 | Murakami | G06V 30/413 |
| 2019/0147103 | A1 * | 5/2019 | Bhowan | G06N 5/022 707/737 |
| 2020/0302016 | A1 * | 9/2020 | Aggarwal | G06F 16/93 |
| 2021/0034858 | A1 * | 2/2021 | Singh | G06V 30/414 |
| 2022/0035996 | A1 * | 2/2022 | Radha Krishnan | G06F 40/131 |
| 2022/0107802 | A1 * | 4/2022 | Rao | G06F 16/907 |
| 2022/0215287 | A1 * | 7/2022 | Klaiman | G06N 3/088 |

OTHER PUBLICATIONS

Milewski, Automatic Recognition of Handwritten Medical Forms for Search Engines, Center of Excellence for Document Analysis and Recognition, 2009 (Year: 2009).*

* cited by examiner

*Primary Examiner* — Stephen S Hong
*Assistant Examiner* — Matthew J Ludwig
(74) *Attorney, Agent, or Firm* — Paradice & Li LLP

(57) ABSTRACT

Systems and methods for machine learning (ML) based electronic document completion are described. A system is configured to receive one or more electronic documents to be completed for a user and provide the one or more electronic documents to an ML model. The ML model is trained to categorize the one or more electronic documents based on previously categorized electronic documents. The system is also configured to: categorize, for each electronic document of the one or more electronic documents, the electronic document into an electronic document category by the ML model; identify one or more fields to be entered by the user based on categorizing the one or more electronic documents; generate a dynamic form including the one or more fields to be entered; and provide the dynamic form for display to the user. Identifying the one or more fields to be entered may be based on a statistical model.

18 Claims, 5 Drawing Sheets

MACHINE LEARNING MODEL BASED ELECTRONIC DOCUMENT COMPLETION

TECHNICAL FIELD

This disclosure relates generally to the automatic completion of electronic documents, including machine learning model based electronic document completion.

DESCRIPTION OF RELATED ART

Through the expansion of electronic services and applications, documents have moved from paper to electronic format. For example, various applications, contracts, business documents, tax returns, and other forms may be in an electronic form and completed electronically (such as with user completable fields). As a result, instead of a person receiving a paper document and filling in the document with a pen, the person may enter requested information into specific fields of the electronic document using a document editor. As the number and variety of electronic documents increase over time (which may also increase in complexity), a user may need to accurately complete increasingly more electronic documents for various endeavors.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for automatically completing one or more electronic documents. The method includes receiving one or more documents to be completed for a user and providing the one or more electronic documents to a machine learning (ML) model. The ML model is trained to categorize the one or more electronic documents based on previously categorized electronic documents. The method also includes categorizing, for each electronic document of the one or more electronic documents, the electronic document into an electronic document category by the ML model. The method further includes identifying one or more fields to be entered by the user based on categorizing the one or more electronic documents, generating a dynamic form including the one or more fields to be entered, and providing the dynamic form for display to the user.

In some implementations, the method may also include receiving one or more user inputs to the dynamic form and completing the one or more electronic documents based on the one or more user inputs. The method may further include retraining the ML model based on the one or more user inputs. The method may also include updating the dynamic form based on retraining the ML model.

Another innovative aspect of the subject matter described in this disclosure can be implemented in a system for automatically completing one or more electronic documents. An example system includes one or more processors and a memory storing instructions that, when executed by the one or more processors, cause the system to perform operations. The operations include receiving one or more documents to be completed for a user and providing the one or more electronic documents to an ML model. The ML model is trained to categorize the one or more electronic documents based on previously categorized electronic documents. The operations also include categorizing, for each electronic document of the one or more electronic documents, the electronic document into an electronic document category by the ML model. The operations further include identifying one or more fields to be entered by the user based on categorizing the one or more electronic documents, generating a dynamic form including the one or more fields to be entered, and providing the dynamic form for display to the user.

In some implementations, the operations may also include receiving one or more user inputs to the dynamic form and completing the one or more electronic documents based on the one or more user inputs. The operations may further include retraining the ML model based on the one or more user inputs. The operations may also include updating the dynamic form based on retraining the ML model.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like numbers reference like elements throughout the drawings and specification.

DETAILED DESCRIPTION

Figure 1:
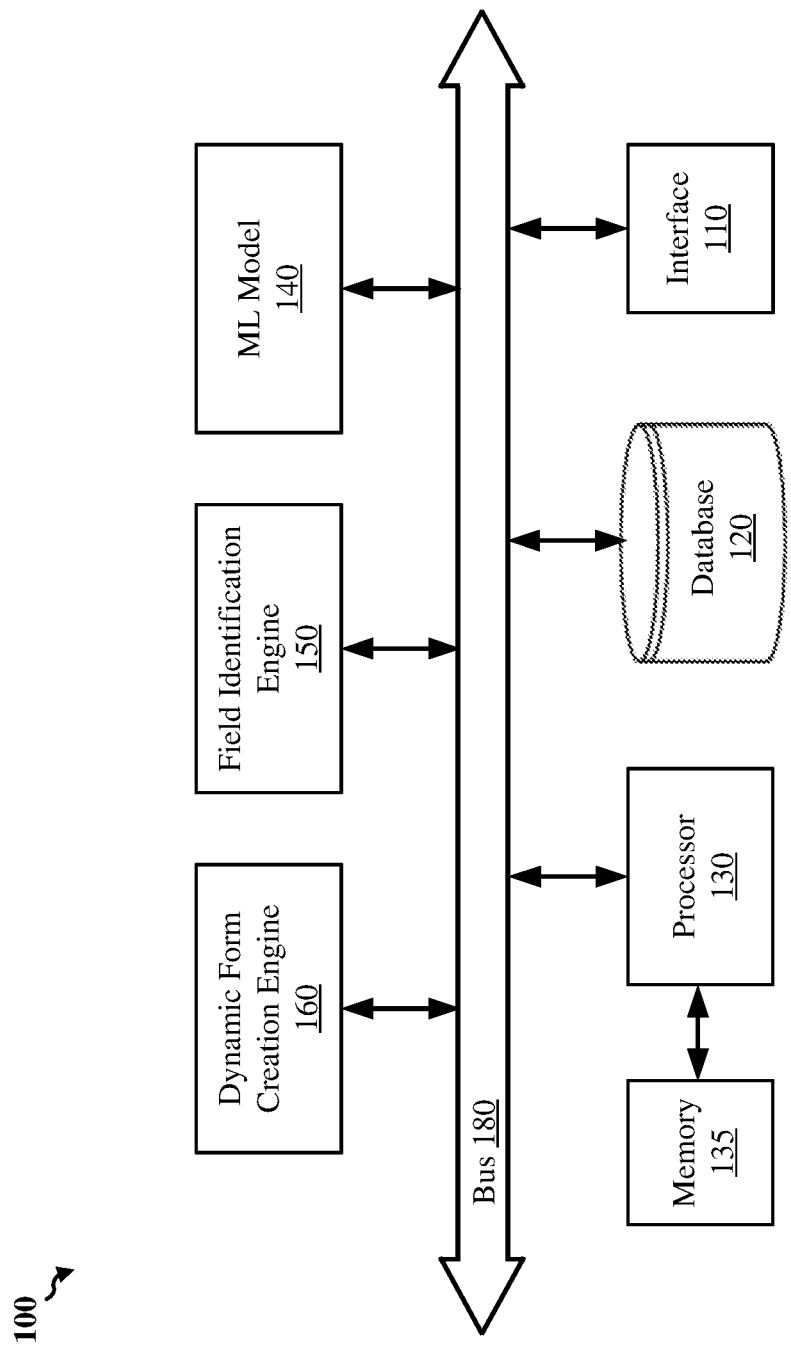
FIG. 1 shows an example system to automatically complete one or more electronic documents.

Implementations of the subject matter described in this disclosure may be used for automatic completion of one or more electronic documents. In particular, systems and methods of machine learning (ML) based electronic document completion are described. Through the use of an ML based system to categorize electronic documents, fields of complex electronic documents may be identified and presented to a user in a simplified form so as not to cause confusion and reduce the likelihood of input errors by the user. Such user inputs may be used to complete a plurality of electronic documents of a specific category and optimize the ML model to better categorize documents and identify fields needing input by a user. As used herein, an electronic document may also be referred to as a document or similar terminology.

Various electronic documents exist today. For example, a business may create various contracts, an insurance company may create various insurance policies, a university may create various enrollment, financial aid, and course curriculum documents, a taxation or revenue bureau of a government (such as the Internal Revenue Service (IRS)) or a company providing tax return preparation services (such as Intuit® TurboTax®) may generate electronic tax return documents, and so on that are filled out electronically. The use of electronic documents over paper documents provide many advantages, such as reduction in time and effort in completing documents, readability of answers through typeset, ability to identify or correct errors, and reduction of waste through less need of paper products.

As time passes, the number of electronic documents increase. For example, a university may have one or more electronic documents for semester enrollment, one or more electronic documents for class registration, one or more electronic documents for applying for financial aid, and so on. Even the financial aid aspect of a university may have one or more documents for government based financial aid, one or more documents for school endowment based financial aid, one or more documents for merit based financial aid, and so on. In another example, a plurality of documents exist for tax returns. For example, a tax return of an individual in the United States may include a 1040 tax return document, one or more 1099 documents, one or more schedules to accompany the 1040 document, a state tax return document, and one or more schedules to accompany the state return document. If the person owns a small business or is self-employed, even more documents may be required to complete the tax return.

Many times, different documents include the same or similar fields. For example, the various tax return documents may include a field for a person's name, the person's identification number (such as a tax identification number or a social security number), the person's address, the person's income information, the person's employer information, and so on. In another example, various university documents may include a field for a student's name, the student's identification number, the student's year of enrollment, and so on. Traditionally, a person would need to fill out each document, thus repeating inputs for the fields that are repeated across various documents. One problem with manually generating inputs to each repeated field is that a user may make a mistake in filling out one or more fields (causing a field's input to differ from the same field's input on a different document). Another problem is that forcing a user to repeat entries for the same field across document increases the amount of time and burden on the user in completing the documents. For example, if a web application (such as a service hosted on a remote server and accessed via a web browser) is used to complete fields in the electronic documents, accessing and completing each field manually requires a plurality of network calls. The network calls and responses are the most time intensive part of completing the documents. As such, requiring each instance of a field be manually completed significantly increases the amount of time required from a user for the documents to be completed.

A company or institution that creates the documents (such as a university providing university documents) or a company or institution that helps complete the documents (such as a company providing tax preparation services or software to complete tax return documents) may assist in the completion of electronic documents having the same fields by manually identifying and linking fields requiring the same input. For example, a programming team (including tax experts) for a tax return software may manually take each tax return document, identify the fields that need to be completed, identify and link the fields that are the same across the various tax return documents, and use the linkage to allow an input to one tax return document field to be used to complete all tax return documents for an individual or entity. In this manner, each new or updated tax return document generated by a government entity must be manually ingested and processed by the programming team in order to create current linkages between fields across each combination of electronic documents that may be completed for a user. The same may occur at a university attempting to assist a student in completing financial aid documents. If the university has a team ingesting each financial aid document and linking similar fields across the various combination of documents, the team must ingest each new or updated document as it is created or received in order to update the linkages of fields among documents.

One problem with manually linking fields between electronic documents is that the frequency at which electronic documents are created or updated is increasing. For example, as taxation laws or codes are created or updated, new tax return documents are created. As a result, a programming team for a tax return service or software must grow in size and expertise in order to ingest the documents and create the necessary links across the various combinations of documents in a timely fashion, and the resources required for such manual linkage may become unmanageable. Another problem is that different individuals or entities may desire to manually input certain fields while allowing automatic input of other fields. For example, one person may wish to manually complete his or her address for each document (such as if a different address is to be used on some documents) while another person may wish to have as many fields as possible (including his or her address) be automatically completed. As such, there is a need to automatically identify fields that are the same across a plurality of documents in order to allow automatic completion of such fields. The automatic identification of fields to be automatically completed may be performed for new or updated electronic documents based on previously received and completed electronic documents. In addition, the request for information for various fields need to be presented in an easy to understand format, as some documents may include verbiage or formatting that may confuse some users.

Various implementations of the subject matter disclosed herein provide one or more technical solutions to the technical problem of automatic completion of electronic documents through the automatic identification of fields for completion. In some implementations, a system is configured to receive one or more electronic documents to be completed for a user and provide the one or more electronic documents to a machine learning (ML) model. The ML model is trained to categorize the one or more electronic documents based on previously categorized electronic documents. The system is also configured to categorize, for each electronic document of the one or more electronic documents, the electronic document into an electronic document category by the ML model. The system is further configured to identify one or more fields to be entered by the user based on categorizing the one or more electronic documents, generate a dynamic form including the one or more fields to be entered, and provide the dynamic form for display to the user. The dynamic form may be presented in an easy to understand format to prevent user input errors. In addition, user inputs to the dynamic form may be used to complete the electronic documents as well as train the ML model to better categorize the electronic documents and better identify the fields to be presented in the dynamic form. In this manner, the dynamic form may be adjusted to meet the desires of the user and improve the user experience.

Various aspects of the present disclosure provide a unique computing solution to a unique computing problem that did not exist prior to the creation of electronic documents. The number of fields to be linked may be in the thousands or hundreds of thousands. Through the automatic categorization of documents and linking of fields based on the categorization in order to automatically complete electronic documents with minimal user input, implementations of the subject matter disclosed herein are not an abstract idea such as organizing human activity or a mental process that can be performed in the human mind.

Aspects of the present disclosure as described herein are regarding the generation of a dynamic form that is to be filled in by a user. The dynamic form is based on any graphical user interface in an easy to understand format including fields to be filled in by the user. As compared to some electronic documents that may be in difficult to understand verbiage and formatting (such as some contract documents, insurance documents, and tax return documents), the dynamic form may be simple and understandable by the user to reduce errors caused by a user's misunderstanding. In addition, the form being dynamic refers to the form being able to be automatically updated by the system based on user inputs to the form in order to optimize the user's experience in assisting the system complete the electronic documents.

FIG. 1 shows an example system 100 to automatically complete one or more electronic documents. The system 100 may be configured to categorize electronic documents into different categories, identify fields to be completed for an electronic document based on the categorization, generate a dynamic form to be used to receive user input, and complete the electronic documents based on the user input. The system 100 may also be configured to update the ML model used to categorize the electronic documents. The system 100 includes an interface 110, a database 120, a processor 130, a memory 135 coupled to the processor 130, an ML model 140, a field identification engine 150, and a dynamic form creation engine 160. In some implementations, the various components of the system 100 may be interconnected by at least a data bus 180, as depicted in the example of FIG. 1. In other implementations, the various components of the system 100 may be interconnected using other suitable signal routing resources.

To note, the system 100 may include one computing device or a plurality of computing devices (such as a plurality of servers), and the components of the system 100 may be embodied in any manner across the one or more computing devices. In some implementations, the system 100 is a remote system to a plurality of individuals or other entities that use a service to complete various electronic documents. For example, TurboTax is provided as an online service accessed via a web browser or application that communicates with one or more remote servers including the system 100.

The interface 110 may be one or more input/output (I/O) interfaces to receive one or more electronic documents and user inputs for one or more fields associated with the electronic documents. The interface 110 may also provide a dynamic form to be displayed to a user in order to receive user inputs. Receiving an electronic document may refer to receiving the entirety of an electronic document, receiving metadata associated with an electronic document, or receiving any suitable portion of an electronic document indicating fields included in the electronic document and information regarding a category of the electronic document.

An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from user devices accessing a service for completing one or more electronic documents (such as a plurality of personal computers or other user devices accessing the TurboTax service hosted on the system 100 or other remote systems). In the example of the system 100 being a remote system to the users, the interface 110 may be used to transmit the dynamic form to a user device for display. Transmitting a dynamic form may refer to transmitting the entirety of the dynamic form, metadata or the dynamic form, or other information that may be used by the user device to render the dynamic form for a user. The system 100 may also receive user inputs from a user device in response to providing the dynamic form to the user device, with the user inputs being provided by a user to the user device (such as via a touchscreen, mouse, keyboard, or other input devices). Alternatively, if the system 100 is a local system (such as being included in a user's personal computer), the interface 110 may include a display and a plurality of other user input/output devices (such as a mouse, keyboard, speakers, etc.). In this manner, the system's display may display the dynamic form via a GUI, and the system 100 may receive user inputs to the dynamic form via a mouse, keyboard, or other input devices. In some implementations, the display may be a touchscreen through which touches on the display may be received as user inputs.

The database 120 may store electronic documents, categorizations of the electronic documents, fields associated with the electronic documents, user inputs, or other information that may be used for the completion of one or more electronic documents. The database 120 may also store information regarding a service provided to one or more users or other information to be used for operation of the system 100. In some implementations, the database 120 may include a relational database capable of presenting information as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the ML model 140, the field identification engine 150, and the dynamic form creation engine 160. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the ML model 140, the field identification engine 150, and the dynamic form creation engine 160 that may be executed by the processor 130. The memory 135 may also store any data stored in the database 120 before or after processing by the processor 130 or the one or more components 140-160. For example, the memory may obtain information regarding the one or more electronic documents, the one or more fields included in the electronic documents, user inputs, etc. that may be stored in the memory 135. After performing operations by the processor 130, the output of the operations is provided by the processor 130 to the memory 135, and the output is then provided from the memory 135 to the database 120. To note, in some implementations, hardwired circuitry may be used in place of, or in combination with, software instructions to implement aspects of the disclosure. As such, implementations of the subject matter disclosed herein are not limited to any specific combination of hardware circuitry and/or software.

The ML model 140 receives one or more electronic documents and categorizes the one or more electronic documents into one or more categories. In some implementations, the categories may be initially defined by a developer or a user. The ML model may then adjust the categories based on user inputs and the documents to be categorized. For example, an initial categorization for tax return documents may be state tax return documents and federal tax return documents. As the ML model processes electronic documents, the ML model may generate additional subcategories, such as 1040 based tax return documents, small business income tax return documents, and so on. In some other implementations, the categories may be set by a developer or user, with the ML model sticking to categorizing the electronic documents to the set categories.

The ML model 140 may be any suitable categorization model for categorizing the electronic documents. In some implementations, the ML model 140 is a random forest model. In some other implementations, the ML model 140 may be a decision tree, a boosted decision tree, or another suitable classification tree. The ML model 140 may be trained using existing electronic documents that have been completed. For example, for tax returns, the last five years (or another suitable time frame) of completed tax return documents may be provided to the ML model 140 for categorization. As noted above, receiving an electronic document may include receiving the metadata of the document or other information associated with the document to allow for categorization. The information received by the ML model 140 for a completed electronic document may be key value pairs of fields and entered values or some other format of information for the electronic document. In some implementations, the input information may also include formatting information of the electronic document (such as locations of fields, lines or other objects in the document). Additionally or alternatively, the input information may also include text information outside of the fields that are included in the electronic document. To note, any suitable information from the electronic document may be used in training the ML model 140 to categorize the electronic document. In some implementations, the training is supervised. For example, each completed tax return document may be labeled as being part of a specific category. The ML model 140 may categorize the tax return document and use the difference between its categorizations and the labels are used as feedback to train the ML model 140.

As described above, the ML model 140 may be trained to categorize documents based on the information in previously completed documents. In some implementations, the ML model 140 may also be trained to categorize documents based on individual or entity information. For example, if one or more electronic documents are to be categorized for a specific user, the user may have an account with the company providing the service, and the account may include a user profile. If the user is an agent of a business, the profile may indicate if the business is a small business (such as less than 50 employees) or a different size business, the location of the business, the area of the business (such as a specific type of manufacturing, business services, etc.), or other information associated with the business. Such profile information may be associated with completed tax return documents and provided to the ML model 140 with the completed tax return documents. In this manner, the ML model 140 may use the user information as inputs in categorizing the tax return documents. As a result, the same type of electronic document between two users may be categorized into different categories based on the user information. For example, two separate categories may exist for a small business and for other size businesses. The ML model 140 may categorize a tax return document based on the size of the business associated with the user.

In addition to being initially trained, the ML model 140 may be further trained based on user inputs received for a dynamic form. As noted herein, the dynamic form may include fields to be completed by the user. In some implementations, the dynamic form may also allow the user to indicate if specific fields are not to be included, if additional fields are to be included, or other information that may be used to adjust the ML model 140. Such user inputs may be used as feedback to further train the ML model 140 to optimize the categorizations. While some hyperparameters for the ML model 140 have been indicated, any suitable hyperparameters may be used as inputs to the ml model 140 and for training the ML model 140. As such, the present disclosure is not limited to the specific examples provided above.

For one or more electronic documents that are categorized by the trained ML model 140, the field identification engine 150 obtains the categorizations and identifies one or more fields to be entered by a user for the one or more electronic documents. In some implementations, the field identification engine 150 may include a statistical model to identify the fields that appear in a threshold number of electronic documents in the same category. For example, the database 120 may include a compilation of the fields of the electronic documents categorized to a first category (and for other categories). If a first electronic document is categorized by the ML model 140 into the first category, the field identification engine 150 may identify fields existing in at least a threshold number or a threshold percentage of the electronic documents in the first category. A dynamic form to be generated for the first electronic document may thus include the fields existing in the threshold number or percentage of electronic documents in the first category. In some implementations, the threshold number or percentage may be 70 percent of the electronic documents in the category. In some other implementations, the threshold number or percentage may be based on a Gaussian distribution (or another suitable distribution) of all fields in the electronic documents in a category (such as the threshold number of electronic documents for a specific field being equal to one standard deviation above the median from the distribution of all fields).

In some implementations, the statistical model may be adjusted by the user input to a dynamic form. For example, as noted above, the user may provide feedback as to one or more fields not to be included in the form, one or more additional fields, or other information. In some implementations, the system 100 may use such feedback to adjust the threshold number or percentage for the specific fields. For example, increasing the threshold may be in fixed or adjustable steps. In some implementations, the threshold may be increased to a maximum value (such as 100 percent) to prevent the field from being identified and included in the dynamic form. Conversely, the threshold may be decreased to a minimum value (such as 0 percent) to ensure that the field is always included in the dynamic form. While some examples of configuring and adjusting the field identification engine 150 are provided, the field identification engine 150 may be configured and adjusted in any suitable manner.

The dynamic form creation engine 160 obtains the one or more fields identified by the field identification engine 150 and generates the dynamic form including the one or more fields to be entered by a user. The dynamic form may be displayed to a user for the user to provide user inputs associated with the one or more fields. In some implementations, the dynamic form engine 160 may include a web player configured to generate the dynamic form based on the outputs of the field identification engine 150 indicating the fields to be included. The web player may be implemented in JavaScript or another suitable programming language. In some other implementations, the dynamic form creation engine 160 may be configured to package the information to be sent to a web player for display of a dynamic form. For example, if the system 100 is a remote system to a user (with the user accessing the system 100 via a web browser and the internet), generating the dynamic form may include packaging the information (including the fields to be presented, formatting information, or other information to be presented in the dynamic form) to be sent to a user device. The interface 110 of the system 100 may transmit the packaged information to a user device, and the user device may use a web player to visualize the information into the dynamic form presented on a GUI of the user device.

While the ML model 140, the field identification engine 150, and the dynamic form creation engine 160 are depicted as separate components of the system 100 in FIG. 1, the components 140-160 may be a single component or combined components, may include additional components, may include software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. For example, in other implementations, components of the system 100 may be distributed across multiple devices, may be included in fewer components, and so on. Exclusively for clarity in explaining aspects of the present disclosure, the system 100 is used to describe performing operations associated with a host in the one or more examples herein.

Figure 2:
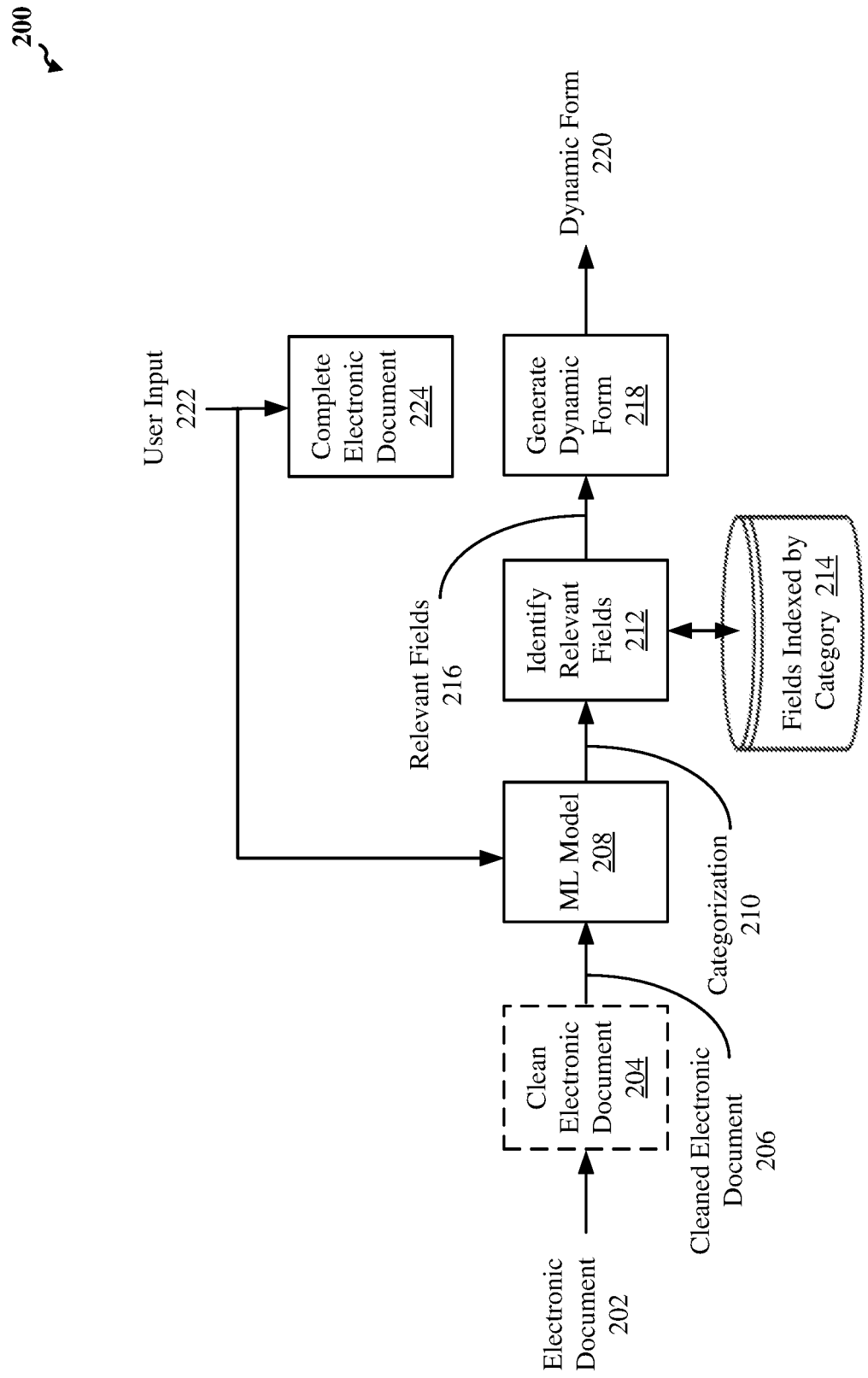
FIG. 2 shows a block diagram for generating a dynamic form to be used in the completion of one or more electronic documents.

FIG. 2 shows a block diagram 200 for generating a dynamic form 220 to be used in the completion of one or more electronic documents 202. The blocks of the block diagram 200 may be embodied in one or more logical or hardware components of the system 100. For clarity in explaining aspects of the present disclosure, the block diagram 200 is described with reference to system 100 in FIG. 1. The system 100 receives one or more electronic documents 202 that are to be completed. Receiving one or more electronic documents may include the interface 110 receiving the electronic documents 202 or the electronic documents 202 being retrieved from the database 120.

In some implementations, an electronic document 202 may be cleaned (204) before being provided to the ML model 208. For example, formatting information or other unnecessary information may be stripped from an electronic document before being provided to the ML model 208. In this manner, the cleaned electronic document 206 may include only the information used as inputs to the ML model 208 for categorization of the electronic document 202. In some other implementations, the electronic document 202 may already be in a format so that the electronic document 202 is provided directly to the ML model 208 (thus excluding block 204).

The ML model 208 (which may be an implementation of the ML model 140) categorizes the electronic document 202 to generate a categorization 210. For the categorization 210, relevant fields are identified (212) based on the fields indexed by category 214. To note, block 212 may be an implementation of field identification engine 150, and information 214 may be included in the database 120 (or another suitable memory). With the relevant fields 216 identified, the dynamic form 220 is generated at block 218 (which may be an example implementation of the dynamic form creation engine 160).

As noted herein, the dynamic form 220 may be presented to a user in any suitable manner. For example, the dynamic form may be presented as a web page, as a pop up window in a web browser, or in another suitable format. In response to presenting the dynamic form 220 to a user, one or more user inputs 222 may be received based on the user interacting with the dynamic form. The one or more user inputs 222 may include entries to the fields displayed in the dynamic form. As such, the system 100 may complete the one or more electronic documents 202 using the user inputs 222 at block 224. In some implementations, the one or more user inputs may also include feedback to be used in training or adjusting the ML model 140. For example, as described herein, the user inputs 222 may include indications of one or more fields to not be included in the dynamic form, one or more additional fields to be included in the dynamic form, or other user feedback. Such user inputs may be provided to the ML model 208, with the ML model 208 being trained based on such user inputs in order to optimize the categorizations (which may cause an adjustment to a categorization of specific documents, the generation or deletion of specific categories, or other adjustments to the ML model 208). With the ML model 208 adjusted, a new categorization 210 may be generated by the ML model 208 and used to identify a different set of relevant fields 216, which may be used to generate an updated dynamic form. While not shown in FIG. 2, in some implementations, the user inputs 222 may also be used as feedback to block 212 (such as to the field identification engine 150) to adjust how relevant fields 216 are identified (such as adjusting the threshold number or percentage of electronic documents in a category to include the field). As such, the dynamic form 220 may be updated based on a new set of relevant fields 216 being identified after the adjusting the process in block 212. In some implementations, the ML model 208 or the identification of relevant fields 212 may be iteratively adjusted to update the dynamic form until no additional user feedback to adjust the dynamic form is received.

Figure 3:
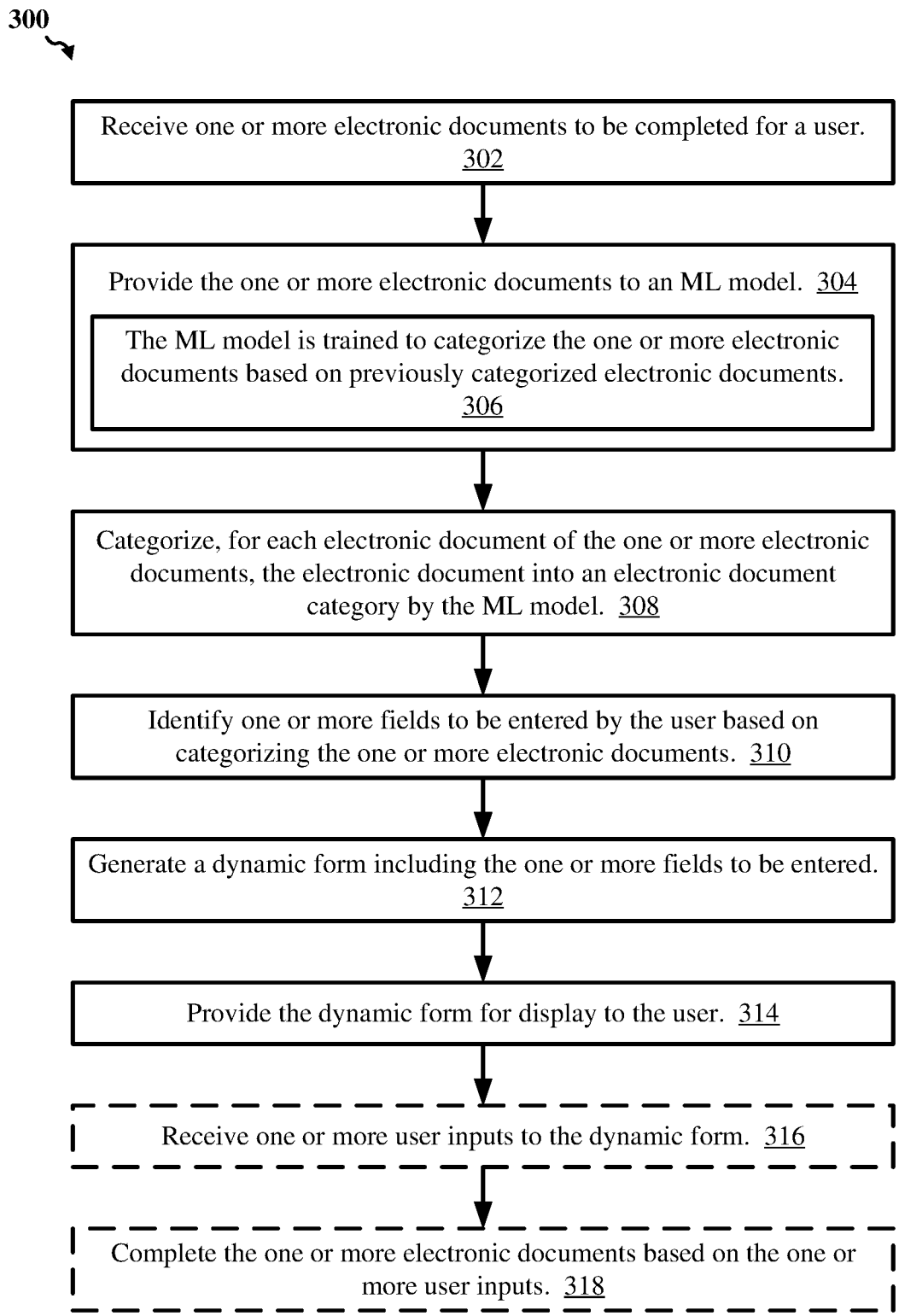
FIG. 3 shows an illustrative flow chart depicting an example operation for automatically completing one or more electronic documents.

FIG. 3 shows an illustrative flow chart depicting an example operation 300 for automatically completing one or more electronic documents. The example operation 300 is described as being performed by components of the system 100 in FIG. 1 or components of the diagram 200 in FIG. 2. At 302, the system 100 receives one or more electronic documents to be completed for a user. In some implementations, the one or more electronic documents may be received by the interface 110. For example, a user device may indicate which documents are to be completed or provide the documents to be completed. The interface 110 may thus obtain the identified documents from the user device or from a repository of documents. Additionally or alternatively, one or more electronic documents may be stored in the database 120 (or otherwise locally to the system 100). As such, receiving the one or more electronic documents may include obtaining the stored documents from the database 120 or other local storage.

To note, the one or more electronic documents to be completed for a user may be based on previous electronic documents completed for the user. For example, over the past five years of tax return documents, the same type of tax return documents may be completed each year. As such, a current year tax return may include tax return documents to be completed that are the same type of tax return documents previously completed over the last five years. In this manner, the system 100 may be configured to automatically retrieve tax return documents to be completed based on the types of tax return documents previously completed for the user.

At 304, the system 100 provides the one or more electronic documents to an ML model (such as the ML model 140 or 208). As noted herein, providing the one or more electronic documents may include providing metadata or other information of the electronic document used in categorizing the electronic document. The ML model is trained to categorize the one or more electronic documents based on previously categorized electronic documents (306). For example, if the ML model is to categorize tax return documents, a repository may store previously completed tax return documents. The past five years (or another suitable time frame) of completed tax return documents may be obtained from the repository by the interface 110 and provided to the ML model 140 to train the ML model 140. In some implementations, user profiles or other user account information may also be obtained by the interface 110 and used to train the ML model 140 for categorizing electronic documents.

At 308, the system 100 (such as the ML model 140) categorizes, for each electronic document of the one or more electronic documents, the electronic document into an electronic document category. As noted above, the categories may be predefined and/or may be defined or adjusted by the ML model 140. In some implementations, the ML model includes a random forest classification model. While not depicted in FIG. 3, categorizing an electronic document may also be based on user information associated with the electronic document to be categorized. For example, for a user device communicating with the system 100, the user may have a user account with the company providing the service that completes the electronic documents. Some user account information may be obtained by the system 100 (such as from the user device or from a repository including user account information) and used as further inputs to the ML model 140 to categorize an electronic document.

At 310, the system 100 identifies one or more fields to be entered by the user based on categorizing the one or more electronic documents. In some implementations, identifying the one or more fields to be entered is based on a statistical model to identify fields existing in previously categorized electronic documents of the same categories as the one or more electronic documents. For example, the statistical model may include identifying a field to be entered based on a threshold number of electronic documents of a same category having the field. In a specific example, if an electronic document is categorized to a first category, the statistical model may be used to identify the fields existing in at least 70 percent of the electronic documents in the first category. To note, while a threshold number is provided as an example, any statistical representation of the fields appearing in the electronic documents may be used to identify the fields to be included in a dynamic form.

At 312, the system 100 (such as the dynamic form creation engine 160) generates a dynamic form including the one or more fields to be entered. At 314, the system 100 provides the dynamic form for display to the user. In some implementations, if the system 100 is remote to a user device, metadata or other information regarding the dynamic form to be displayed to the user may be generated and transmitted to the user device. The user device may thus use a web player or another suitable engine to render the dynamic form, with the dynamic form including the fields to be entered by the user as identified by the field identification engine 150. Alternatively, if the system 100 is included in a local user device, the system 100 may display the dynamic form to a user via a GUI or another suitable interface. An example implementation of the dynamic form as displayed in a GUI is presented in FIG. 4 and FIG. 5.

Figure 4:
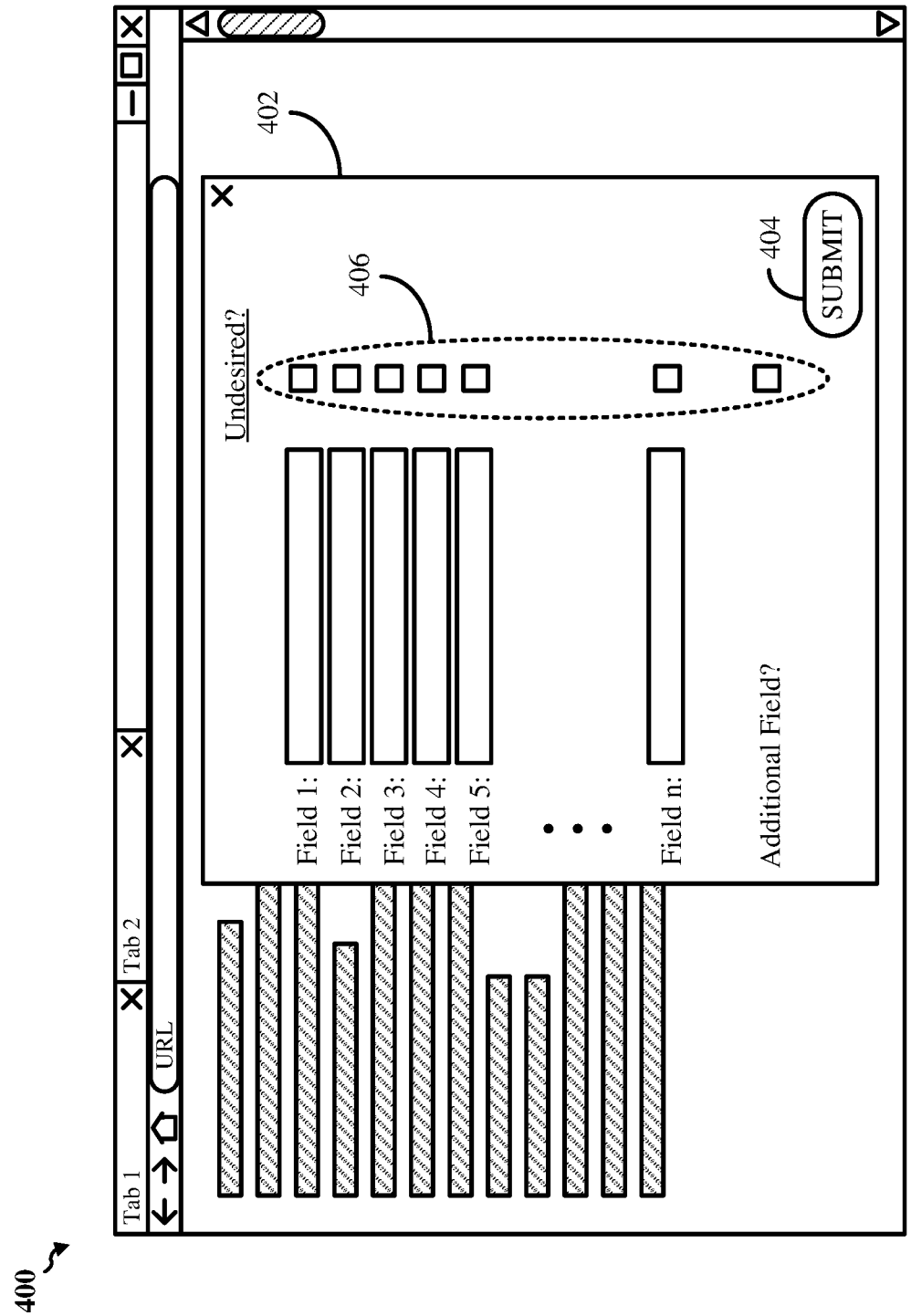
FIG. 4 shows an illustration of an example graphical user interface (GUI) for displaying a dynamic form.

FIG. 4 shows an illustration of an example GUI 400 for displaying a dynamic form 402. As depicted, the GUI includes a web browser open to a specific URL. The URL may be to access the service provided by a company (such as to TurboTax for tax return preparation services). When the user is to have a new tax return generated, the system 100 may obtain the tax return documents to be completed (such as based on the history of completed tax return documents for the user), categorize the tax return documents, identify the fields to be included in a dynamic form 402 based on the categorizations of the tax return documents to be completed, and generate the dynamic form 402 that is to be displayed in the GUI 400. As depicted, the dynamic form 402 may include fields 1-n (for any suitable integer n) that may have been identified for at least one electronic document to be completed (such as fields 1-3 for a first electronic document, fields 1, 3, and 4 for a second electronic document, and so on for all of the electronic documents to be completed). As depicted, the dynamic form 402 includes areas for the user to type an entry for each of the fields. For example, the user may user a cursor to select the boxed area and use a keyboard to type the entry for the field. After the user inputs the entries for the fields, the user may select the submit button 404 for the entries to be submitted as user input.

In some implementations, system 100 uses the user inputs to complete the one or more electronic documents for the user. As such, the example operation 300 in FIG. 3 may include blocks 316 and 318. At 316, the system 100 receives one or more user inputs to the dynamic form. For example, with the entries to the dynamic form 402 being submitted, the user inputs are received by the system 100 (such as from the user device for a remote system or from a user interface for a local system). At 318, the system 100 completes the one or more electronic documents based on the one or more user inputs. If any fields are still to be entered after using the user inputs, the electronic documents may be presented to the user in a GUI for in another format for the user to provide information to finalize the electronic documents.

As further noted herein, the ML model may be retrained based on the one or more user inputs. In some implementations, the one or more user inputs may indicate one or more of a validation of the one or more fields to be entered as to be included in the dynamic form, a field that should be included but is not included in the dynamic form, or a field that is included but should not be included in the dynamic form. The GUI 400 in FIG. 4 depicts example types of user inputs that may be received for the dynamic form 402 indicating such information. For example, the dynamic form 402 may include checkboxes 406 to indicate which fields are undesired to be included in the dynamic form 402. If the user checks any of the boxes, the field associated with the checkbox is indicated as not to be included in the dynamic form. In this manner, the user inputs may indicate a validation of the one or more fields to be entered as to be included in the dynamic form (with a checkbox not being checked) and may indicate a field that is included but should not be included in the dynamic form (with a checkbox being checked). Alternatively, the checkboxes may be used to indicated desired fields (with the checkboxes being checked indicating the fields to remain included in the dynamic form 402). To note, while some examples are provided, other implementations for receiving user input may be implemented to indicate which fields are to be removed. For example, a user not providing an entry for a field may indicate that the field is not to be included in the dynamic form 402. In another example, each field may include a delete button or other indication to remove the field from the dynamic form 402. In another example, the user may click on a field and press backspace or delete on a keyboard to indicate that the field is to be deleted from the dynamic form.

The checkboxes 406 may also include a checkbox to indicate if additional fields not included in the displayed fields is to be included in the dynamic form 402. In this manner, the user inputs may indicate a field that should be included but is not included in the dynamic form. For example, the user may wish for a field x to be included that is not included in the dynamic form 402. As such, the user may check the checkbox associated with the additional field.

Figure 5:
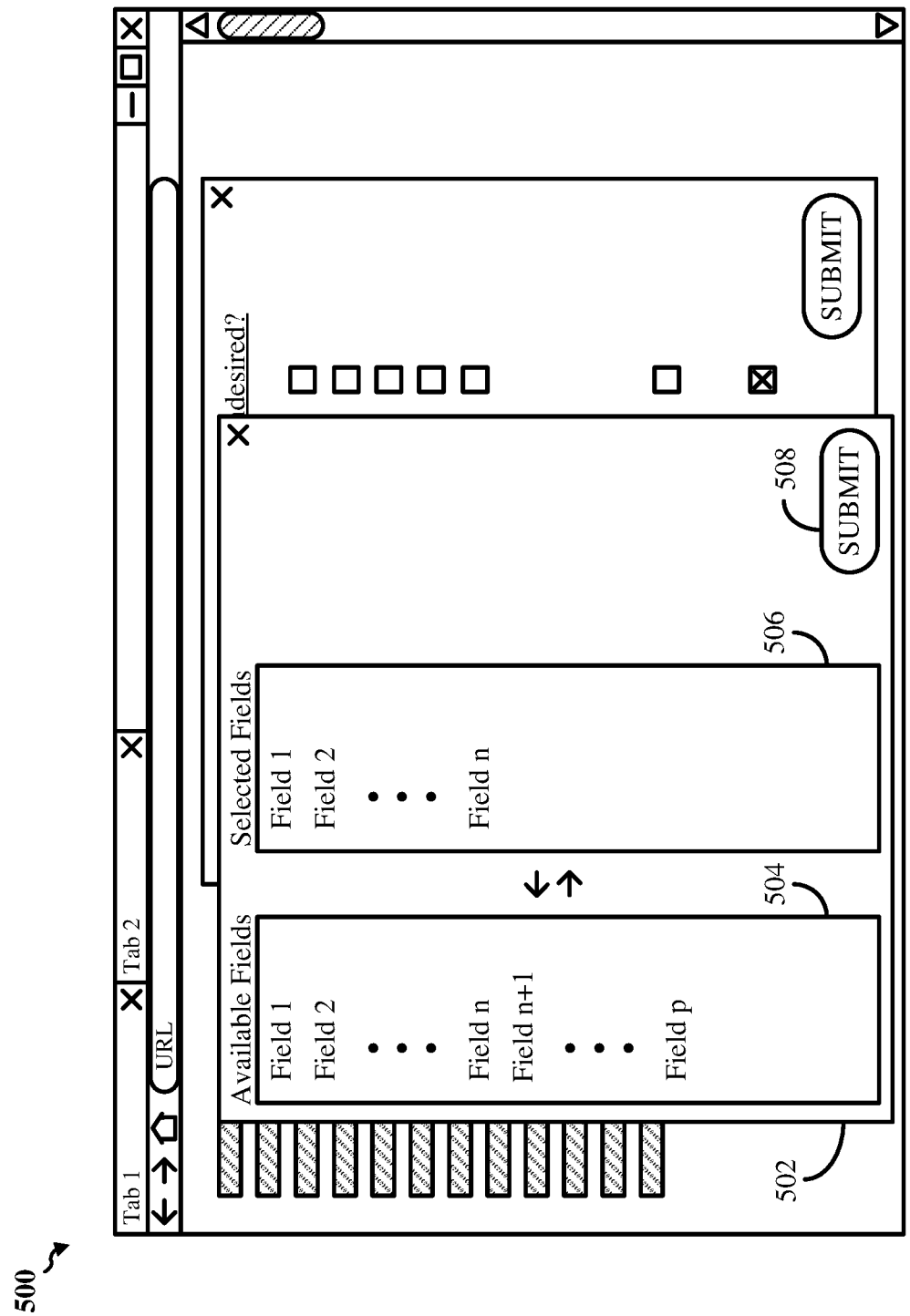
FIG. 5 shows an illustration of an example GUI for receiving one or more user inputs.

FIG. 5 shows an illustration of an example GUI 500 for receiving one or more user inputs. The GUI 500 may be an implementation of the GUI 400 after the user selects the checkbox beside additional field in dynamic form 402 and press the submit button 404. The additional window 502 pops up on the GUI 500 to allow the user to indicate which fields are to be included in the dynamic form. As shown, the available fields 504 may indicate the fields included in the one or more electronic documents. The selected fields 506 indicate the fields to be included in the dynamic form. The selected fields 506 may indicate the fields 1-$n$ initially included in the dynamic form 402. The user may use a cursor to drag and drop fields from left to right to indicate additional fields to be included. In some implementations, the user may also use a cursor to drag and drop fields from right to left to indicate fields not to be included. Alternatively, the user may use a cursor to select a field in the selected fields 506 and a keyboard delete key or other user input to remove the field from the selected fields 506. After finalizing the list of selected fields 506, the user may select the submit button 508. Such user inputs may be used as feedback for updating the dynamic form. To note, if such as pop up window 502 is used to adjust the selected fields, the checkboxes 406 to indicate fields to be deleted may not be included in the dynamic form 402.

While the dynamic form 402 (and the additional window 502) is depicted as a pop up window in a web browser, the dynamic form and other forms may be depicted in any suitable manner. For example, the dynamic form may be displayed as a new tab in a web browser, as part of the existing tab in the web browser, in any format in a separate application running on the user device, and so on. In addition, while the requested user inputs to adjust the dynamic form are depicted as checkboxes and drag and drop fields, such user inputs may be in any suitable format to indicate the intention of the user. For example, the user may provide comments via freeform text, which may be processed to determine how the dynamic form is to be adjusted. For example, the freeform text may be processed to identify keywords or n-grams, relational terms near specific keywords (such as "not needed," "unwanted," or other terms within five words of a keyword indicating a specific field), a user sentiment score, or other text information indicating specific fields to be included or excluded from the dynamic form. In some implementations, the user input may also indicate a different category or may verify the category output by the ML model for one or more electronic documents. For example, the dynamic form may indicate the category for each of the documents, and the user may verify the category. In some implementations, the user may select a different category.

The user inputs may be used to retrain the ML model. For example, the user inputs received at block 316 of FIG. 3 may also be saved as training data in the database 120. In retraining the ML model, the categories may be adjusted for the one or more electronic documents so that different fields are identified to be included in the dynamic form. In some implementations, the system 100 updates the dynamic form based on retraining the ML model. In some implementations, retraining the ML model may also include adjusting the statistical model so that different fields are identified to be included in the dynamic form based on the categorizations from the ML model. In this manner, an adjusted dynamic form may be presented to the user. If the user provided any entries to the previously displayed fields, the entries to those fields may be included in the adjusted dynamic form (thus saving the user's previous work). While not depicted in FIG. 4 or FIG. 5, in some implementations, the user may be afforded the ability to indicate if another adjusted dynamic form is to be displayed. For example, the dynamic form 402 in the GUI 400 may include a checkbox 406 to indicate whether the dynamic form is to be presented again. If the user does not want another dynamic form displayed, the checkbox may be used to indicate such intention. As such, the iterations of the system 100 updating the dynamic form may be stopped based on the user input. Otherwise, the system 100 may continue to provide an updated dynamic form until the dynamic form no longer changes between iterations.

As described herein, through a ML model categorizing electronic documents and using the categories to link fields to be completed across the electronic documents, a system may automatically ingest new electronic documents or updated electronic documents without needing a development team and experts to manually process, index, and link fields and electronic documents. In addition, through the use of a dynamic form generated by the system (instead of a static form predefined by a development team), user inputs to complete the electronic documents may be tailored to the specific combination of documents without requiring a different static form be created for each combination of documents. Furthermore, the dynamic form may be automatically updated to better meet the needs of the user, such that the form may differ even from user to user.

The examples herein use tax return documents exclusively for clarity in explaining aspects of the present disclosure. However, as noted above, aspects of the present disclosure may be applied to any electronic documents that may be categorized. As such, the present disclosure is not to be limited to a specific type of electronic document. In addition, specific examples of user inputs, feedback, formatting of dynamic forms, and so on are provided exclusively for clarity in explaining aspects of the present disclosure. However, the dynamic form and user inputs may be implemented in any suitable manner.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for automatically completing one or more electronic documents, comprising:
   receiving one or more electronic documents to be completed for a user;
   providing the one or more electronic documents to a machine learning (ML) model, wherein the ML model is trained to categorize the one or more electronic documents based on previously categorized electronic documents;
   for each electronic document of the one or more electronic documents, categorizing the electronic document into an electronic document category of an electronic document type by the ML model;
   identifying one or more fields existing in the one or more electronic documents based on categorizing the one or more electronic documents, wherein:
   the one or more fields are user completable; and
   identifying a user completable field of the one or more fields existing in an electronic document of the one or more electronic documents and in a specific electronic document category includes identifying the user completable field existing in a threshold number of previously categorized electronic documents in the specific electronic document category;
   generating a dynamic form including the one or more fields to be entered by the user; and
   providing the dynamic form for display to the user.

2. The method of claim 1, wherein identifying the one or more fields to be entered is based on a statistical model to identify fields existing in previously categorized electronic documents of the same categories as the one or more electronic documents.

3. The method of claim 1, further comprising:
receiving one or more user inputs to the dynamic form; and
completing the one or more electronic documents based on the one or more user inputs.

4. The method of claim 3, further comprising retraining the ML model based on the one or more user inputs.

5. The method of claim 4, wherein the one or more user inputs indicate one or more of:
a validation of the one or more fields to be entered as to be included in the dynamic form;
a field that should be included but is not included in the dynamic form; or
a field that is included but should not be included in the dynamic form.

6. The method of claim 4, further comprising updating the dynamic form based on retraining the ML model.

7. The method of claim 1, wherein the ML model includes a random forest classification model.

8. The method of claim 1, wherein the one or more electronic documents to be completed are based on previous electronic documents completed for the user.

9. The method of claim 2, wherein identifying the one or more fields based on the statistical model includes accessing a database storing compilations of fields indexed by electronic document category, wherein each compilation is associated with an electronic document category and indicates fields existing in the threshold number of previously categorized electronic documents of the electronic document category.

10. A system for automatically completing one or more electronic documents, the system comprising:
one or more processors; and
a memory storing instructions that, when executed by the one or more processors, causes the system to perform operations comprising:
receiving one or more electronic documents to be completed for a user;
providing the one or more electronic documents to a machine learning (ML) model, wherein the ML model is trained to categorize the one or more electronic documents based on previously categorized electronic documents;
for each electronic document of the one or more electronic documents, categorizing the electronic document into an electronic document category of an electronic document type by the ML model;
identifying one or more fields existing in the one or more electronic documents based on categorizing the one or more electronic documents wherein:
the one or more fields are user completable; and
identifying a user completable field of the one or more fields existing in an electronic document of the one or more electronic documents and in a specific electronic document category includes identifying the user completable field existing in a threshold number of previously categorized electronic documents in the specific electronic document category;
generating a dynamic form including the one or more fields to be entered; and
providing the dynamic form for display to the user.

11. The system of claim 10, wherein identifying the one or more fields to be entered is based on a statistical model to identify fields existing in previously categorized electronic documents of the same categories as the one or more electronic documents.

12. The system of claim 10, wherein the operations further comprise: receiving one or more user inputs to the dynamic form; and
completing the one or more electronic documents based on the one or more user inputs.

13. The system of claim 12, wherein the operations further comprise retraining the ML model based on the one or more user inputs.

14. The system of claim 13, wherein the one or more user inputs indicate one or more of:
a validation of the one or more fields to be entered as to be included in the dynamic form;
a field that should be included but is not included in the dynamic form; or
a field that is included but should not be included in the dynamic form.

15. The system of claim 13, wherein the operations further comprise updating the dynamic form based on retraining the ML model.

16. The system of claim 10, wherein the ML model includes a random forest classification model.

17. The system of claim 10, wherein the one or more electronic documents to be completed are based on previous electronic documents completed for the user.

18. The system of claim 11, wherein the operations of identifying the one or more fields based on the statistical model comprises accessing a database storing compilations of fields indexed by electronic document category, wherein each compilation is associated with an electronic document category and indicates fields existing in the threshold number of previously categorized electronic documents of the electronic document category.

* * * * *